United States Patent
Flannery et al.

(10) Patent No.: US 9,962,040 B2
(45) Date of Patent: *May 8, 2018

(54) BATH SAFETY RAIL

(71) Applicant: Regalo International, LLC, Longboat Key, FL (US)

(72) Inventors: Mark A. Flannery, Longboat Key, FL (US); Brian G. Linehan, Saint Paul, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/345,145

(22) Filed: Nov. 7, 2016

(65) Prior Publication Data
US 2017/0055779 A1    Mar. 2, 2017

Related U.S. Application Data

(63) Continuation of application No. 14/298,942, filed on Jun. 8, 2014, now Pat. No. 9,486,111.

(60) Provisional application No. 61/832,944, filed on Jun. 9, 2013.

(51) Int. Cl.
*A47K 3/00* (2006.01)
*F16B 47/00* (2006.01)
*A47K 17/02* (2006.01)

(52) U.S. Cl.
CPC ............ *A47K 3/003* (2013.01); *A47K 17/022* (2013.01); *F16B 47/00* (2013.01); *A47K 2201/025* (2013.01)

(58) Field of Classification Search
CPC ........ A47K 3/00; A47K 3/003; A47K 17/022; A47K 2201/00; A47K 2201/02; A47K 2201/025; F16B 47/00
See application file for complete search history.

(56) References Cited

U.S. PATENT DOCUMENTS

| | | |
|---|---|---|
| 2,212,755 A | 11/1938 | Solomon |
| 2,803,420 A | 8/1957 | Hyde |
| 2,908,467 A | 10/1959 | Aberer |
| 3,020,017 A | 2/1962 | Watson |
| 7,887,109 B2 | 2/2011 | Liao |
| 9,486,111 B2 * | 11/2016 | Flannery .............. A47K 17/022 |
| 2007/0210225 A1 | 9/2007 | Carnevali |
| 2008/0251664 A1 | 10/2008 | Hara |
| 2009/0050758 A1 | 2/2009 | Carnevali |
| 2010/0038503 A1 | 2/2010 | Chien |
| 2010/0146697 A1 | 6/2010 | Roth |

* cited by examiner

Primary Examiner — J. Casimer Jacyna

(57) ABSTRACT

A bath safety rail for being engaged to and disengaged from a bath surface. The bath safety rail includes a base, a handle on the base, first and second suction cups opposing the handle, cam followers on the suction cups that extend into the base, and cams in the base to engage and draw up the cam followers and suction cups to thereby create suction. The handle is two-piece where the pieces are separated by a handle plane, where each axis of each suction cup is in the handle plane.

17 Claims, 10 Drawing Sheets

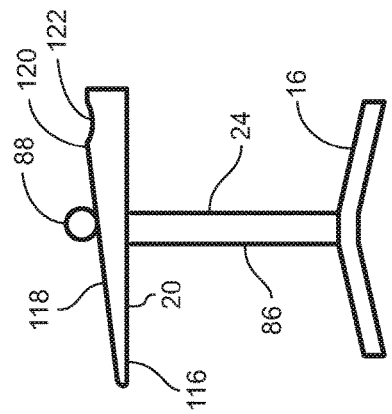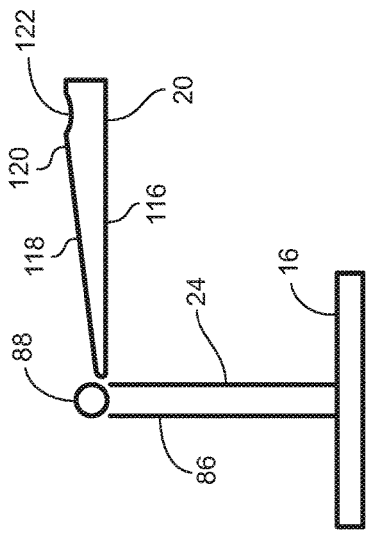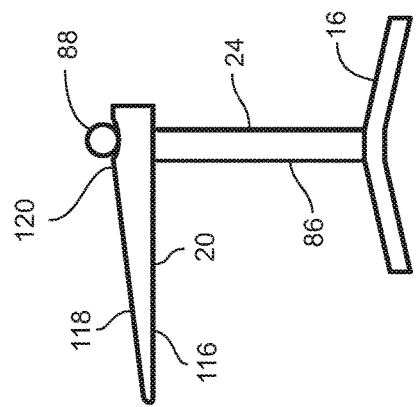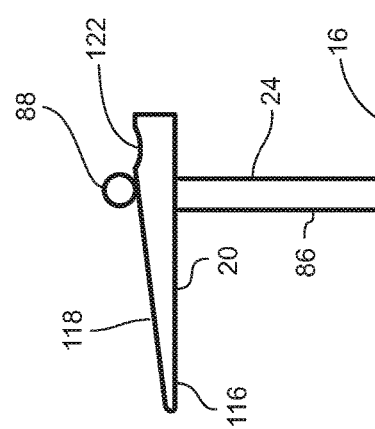

BATH SAFETY RAIL

This application is a continuation of U.S. patent application Ser. No. 14/298,942 filed Jun. 8, 2014 (U.S. Pat. No. 9,486,111 issued Nov. 8, 2016) and claims the benefit thereof under 35 U.S.C. § 120, which claims the benefit under 35 U.S.C. § 119(e) of U.S. Provisional Patent Application No. 61/832,944 filed Jun. 9, 2013, both of which applications are hereby incorporated by reference in their entireties into this application.

FIELD OF THE INVENTION

The present invention relates to a bath safety rail, particularly to a bath safety rail that is anchored on either end by a suction cup, and specifically to a bath safety rail that is anchored on either end by a suction cup and includes a handle opposing the suction cups where the handle is manufactured in two parts and separated by a plane on the axes of the suction cups.

BACKGROUND OF THE INVENTION

A person may grab a bath safety rail when stepping into and out of a bathtub or while changing positions while in the bathtub. A person may grab a bath safety rail when toweling off and while standing on a wet floor outside of a bathtub or shower area.

A bath safety rail may be fixed at a number of locations, such as on a bathtub or a wall of a shower area. At these locations, a bath safety rail may be fixed horizontally or vertically or at an angle.

A bath safety rail may be a permanent part of the fixtures in a bathroom or a removable tool that can be engaged to and disengaged from smooth surfaces of the bathroom. A bath safety rail, if removable, may be placed at a desired position where it remains for days, weeks or months or may be placed at a first position prior to stepping into the bathtub, at a second position during the bath, and at a third position prior to getting out of the bathtub.

A bath safety rail, if removable, may be operated by an adult or a child, either of whom may have strong fingers or hands. A bath safety rail, if removable, often is not operable by a rather weak elderly person having arthritis.

A cam may be a rotating or sliding piece. A cam may be an eccentric wheel or a cylinder with an irregular shape, and employed in a mechanical linkage where, for example, rotary motion is desired to be transformed into linear motion (or linear motion is desired to be transformed into rotary motion).

A cam may be a machine component that either rotates or reciprocates (moves back and forth) to create a prescribed motion in a contacting element (the follower). Since the shape of the contacting surface of the cam is determined by the prescribed motion and the profile of the follower, cams take various forms. Cam-follower mechanisms are particularly useful when a simple motion of one part of a machine is to be converted to a more complicated prescribed motion of another part, one that must be accurately timed with respect to the simple motion and may include periods of rest (dwells).

SUMMARY OF THE INVENTION

A feature of the present invention is a cam and cam follower mechanism for creating suction between a suction cup and a smooth surface.

Another feature of the present invention is the provision in a cam and cam follower mechanism, of a base and of a first suction cup engaged to the base, the first suction cup having a first surface that engages said smooth surface and a second surface that confronts the base.

Another feature of the present invention is the provision in a cam and cam follower mechanism, of a base and a cam follower in the base and engaged to the suction cup.

Another feature of the present invention is the provision in a cam and cam follower mechanism, of a base and a cam in the base and engaging a cam follower, the cam converting rotary motion into linear motion of the cam follower, the cam follower drawing up a portion of the suction cup toward the base to create suction between the suction cup and the smooth surface.

Another feature of the present invention is a bath safety rail having a cam.

Another feature of the present invention is a bath safety rail employing a cam to create suction between a suction cup and a smooth surface.

Another feature of the present invention is to convert rotary motion of a rotating piece in a bath safety rail into a linear or straight line motion that draws up a central portion of a suction cup, thereby creating suction in a suction cup.

Another feature of the present invention is the provision in a bath safety rail, of a base, a handle on the base, and a first suction cup confronting the base, the first suction cup having a first surface that engages the bath surface and a second surface that confronts the base, the first suction cup having a first central portion and a first axis extending through the first central portion, the first suction cup further having a first periphery, the first periphery being in a first plane and the first axis being at a right angle to the first plane.

Another feature of the present invention is the provision in a bath safety rail, of a base, a handle on the base, and a first suction cup confronting the base, of a first stem engaged to the first central portion of the first suction cup and extending from the second surface of the first suction cup, the first stem having a first coaxial portion that is coaxial with the first axis of the first suction cup and a first crosswise portion that extends crosswise relative to the first coaxial portion.

Another feature of the present invention is the provision in a bath safety rail, of a base, a handle on the base, and a first suction cup confronting the base, of a first rotating piece in the base and engaging the first stem, the first rotating piece being turnable on the first axis, the first rotating piece having a first ramp disposed obliquely relative to the first plane, the first ramp engaging the first crosswise portion of the first stem and drawing the first stem away from the plane when the first rotating piece is turned to draw the first suction cup tight and create a greater negative pressure between the bath surface and the first surface of the first suction cup.

Another feature of the present invention is the provision in a bath safety rail, of a base, a handle on the base, and a first suction cup confronting the base, of the first rotating piece further having a first receiver for the first crosswise portion of the first stem, of the first ramp including an upper end spaced from the first plane by a first distance, of the first receiver being spaced from the plane by a second distance that is less than the first distance, and of the upper end of the first ramp leading into the first receiver such that, after the first crosswise piece travels up the first ramp, the first crosswise piece is drawn downwardly into the first receiver by pressure from the first suction cup so as to minimize the first crosswise piece traveling back down the first ramp and maximize retention of suction by the first suction cup.

Another feature of the present invention is the provision in a bath safety rail, of a base, a handle on the base, and a first suction cup confronting the base, of the handle including first and second ends and the base extending between the first and second ends, and of the bath safety rail further having a second suction cup, a second stem and a second rotating piece.

Another feature of the present invention is the provision in a bath safety rail, of a base, a handle on the base, and a first suction cup confronting the base, of the handle including first and second ends and the base extending between the first and second ends, of the bath safety rail further having a second suction cup, a second stem and a second rotating piece, of the first end of the handle opposing the first rotating piece, and of the second end of the handle opposing the second rotating piece.

Another feature of the present invention is the provision in a bath safety rail, of a base, a handle on the base, and a first suction cup confronting the base, of a first rotating piece including first and second ramps, of a first stem including first and second crosspieces that are diametrically opposite of each other, each of the first and second ramps having an upper end and the upper ends being diametrically opposite of each other, each of the first and second ramps having a lower end and the lower ends being diametrically opposite of each other such that the first and second ramps draw the first and second crosspieces away from a first plane at the same time.

Another feature of the present invention is the provision in a bath safety rail, of a base, a handle on the base, and a first suction cup confronting the base, of the base including an inside and an outside, of a first rotating piece including a first tab that extends from the inside to the outside such that the first tab can be manipulated by a finger to rotate the first rotating piece and draw a first suction cup tightly against a bath surface.

Another feature of the present invention is the provision in a bath safety rail, of a base, a handle on the base, and a first suction cup confronting the base, of the base including a circular slot having a first axis and further having first and second ends, of a first tab extending through the circular slot and traveling from the first end to the second end of the circular slot when the first tab is manipulated to turn a first rotating piece.

Another feature of the present invention is the provision in a bath safety rail, of a base, a handle on the base, and a first suction cup confronting the base, of the handle engaging the base through a first rotating piece.

Another feature of the present invention is the provision in a bath safety rail, of a base, a handle on the base, and a first suction cup confronting the base, of the handle being engaged to the base with a fastener, of a first rotating piece having a first through slot for the fastener, the first through slot having a first axis such that the first rotating piece may turn about the first axis.

Another feature of the present invention is the provision in a bath safety rail, of a base, a handle on the base, and a first suction cup confronting the base, of the base including a first receptacle shaped recess for receiving a portion of the first suction cup, the first receptacle shaped recess having a first opening on a first axis, a first stem extending from the first suction cup, then through the first opening, and then to a first rotating piece.

Another feature of the present invention is the provision in a bath safety rail, of a base, a handle on the base, and a first suction cup confronting the base, of a first coil spring between the first suction cup and the base such that a first central portion of the first suction cup is resiliently biased toward a first plane and such that drawing up a first stem with a first ramp compresses the first coil spring.

Another feature of the present invention is the provision in a bath safety rail, of a base, a handle on the base, and a first suction cup confronting the base, of the first suction cup having a first surface that engages the bath surface and a second surface that confronts the base, the first suction cup having a first central portion and a first axis extending through the first central portion, the first suction cup further having a first periphery, the first periphery being in a first plane and the first axis being at a right angle to the first plane, and of the handle being formed of two opposing pieces, each of the opposing pieces being on one side of a handle plane, the first axis being in the handle plane, the handle plane being at a right angle to the first plane.

Another feature of the present invention is the provision in a bath safety rail, of a base, a handle on the base, and a first suction cup confronting the base, of the handle being formed of two opposing pieces and of the two opposing pieces being half pieces.

Another feature of the present invention is the provision in a bath safety rail, of a base, a handle on the base, and a first suction cup confronting the base, of the handle being formed of two opposing pieces and of the two opposing pieces being generally mirror images of each other.

Another feature of the present invention is the provision in a bath safety rail, of a base, a handle on the base, and a first suction cup confronting the base, of the handle being formed of two opposing pieces and each of the opposing pieces being on one side of a handle plane, of a second suction cup confronting the base, the second suction cup having a third surface that engages the bath surface and a fourth surface that confronts the base, the second suction cup having a second central portion and a second axis extending through the second central portion, the second suction cup further having a second periphery, the second periphery being in a second plane and the second axis being at a right angle to the second plane, and the second axis being in the handle plane.

Another feature of the present invention is the provision in a bath safety rail, of a base, a handle on the base, and a first suction cup confronting the base, of the handle being formed of two opposing pieces and each of the opposing pieces being on one side of a handle plane, of the handle including first and second ends and the base extending between the first and second ends, and the bath safety rail further having a second suction cup, the first end of the handle opposing the first suction cup and the second end of the handle opposing the second suction cup, the handle plane cutting through each of the first and second suction cups.

Another feature of the present invention is the provision in a bath safety rail, of a base, a handle on the base, and a first suction cup confronting the base, and of the handle having first and second ends, a first handle portion extending from the first end, the first handle portion being straight and further being one of 1) on the first axis, and 2) parallel to the first axis, a second handle portion extending from the second end, the second handle portion being oblique relative to the first axis, a third handle portion, the third handle portion extending from the first handle portion and being generally in the shape of a dovetail, and a fourth handle portion, the fourth handle portion extending between and undulating between the second and third handle portions.

Another feature of the present invention is the provision in a bath safety rail, of a base, a handle on the base, and a first suction cup confronting the base, and of the handle having first and second ends, a first handle portion extending from the first end, a second handle portion extending crosswise relative to the first handle portion, the second handle portion extending from the first handle portion in the direction of the second end of the handle, a third handle portion, the third handle portion extending from the second handle portion in the direction of the second end and further extending away from the base, a fourth handle portion extending from the third handle portion and extending away from the base to form a peak, a fifth handle portion extending from the fourth handle portion and extending to a location that is further from the first axis than the second end of the handle, and a sixth handle portion extending from the fifth handle portion and back in a direction toward the first axis to the second end of the handle.

Another feature of the present invention is the provision in a bath safety rail, of a base, a handle on the base, and a first suction cup confronting the base, and of the handle having first and second ends, a first handle portion extending from the first end, the first handle portion being straight and further being one of 1) on the first axis, and 2) parallel to the first axis, a second handle portion extending from the second end, the second handle portion extending in a direction away from the first axis and in a direction away from the second end, a third handle portion, the third handle portion extending from the second handle portion and being formed in the shape of an arc, a fourth handle portion, the fourth handle portion extending from the third handle portion and extending to a location that is further from the first axis than the second end of the handle, and a fifth handle portion, the fifth handle portion extending from the fourth handle portion to the second end of the handle.

An advantage of the present invention is that the cam and cam follower make it easy to create suction between a suction cup and a smooth surface. The ramps on the cam work in the nature of levers and incrementally draw up the stems of the suction cups, thereby making it easy for a person with arthritic fingers to provide a powerful suction between the suction cup and the smooth surface.

Another advantage of the present invention is that, once the suction cup is drawn tightly to the smooth surface, the cam follower settles into a recess in the cam such that a return of the cam follower down the ramp to a nonbinding state is minimized.

Another advantage of the present invention is that the rotating piece or cam provides a feel to the user as the user rotates the cam to draw the cam follower into and out of the recess so that the user knows when the suction cup is being drawn tight and when the suction is being released.

Another advantage of the present invention is that the suction can be released slowly, if desired, so as to prevent a startling popping noise in a slippery bathtub or bathroom.

Another advantage of the present invention is that the suction can be released quickly, if desired, so as to quickly get the bath safety rail to another location.

Another advantage of the present invention is that the bath safety rail is simple and inexpensive to manufacture.

Another advantage of the present invention is that the bath safety rail is simple and easy to use and operate.

BRIEF DESCRIPTION OF THE DRAWINGS

FIG. 10A is a diagrammatic view of the cam, cam follower and suction cup of the bath safety rail of FIG. 1, prior to the ramp of the cam engaging the cam follower.

FIG. 10B is a diagrammatic view of the cam, cam follower and suction cup of the bath safety rail of FIG. 1, showing the cam follower having been drawn up about half-way by the ramp of the cam and creating negative pressure in the suction cup.

FIG. 10C is a diagrammatic view of the cam, cam follower and suction cup of the bath safety rail of FIG. 1, showing the cam follower having been drawn up to the top of the ramp of the cam and creating greater negative pressure.

FIG. 10D is a diagrammatic view of the cam, cam follower and suction cup of the bath safety rail of FIG. 1, showing the cam follower having been drawn down slightly by the dip at the top of the ramp and holding relatively great negative pressure in the suction cup.

DESCRIPTION

Figure 1:
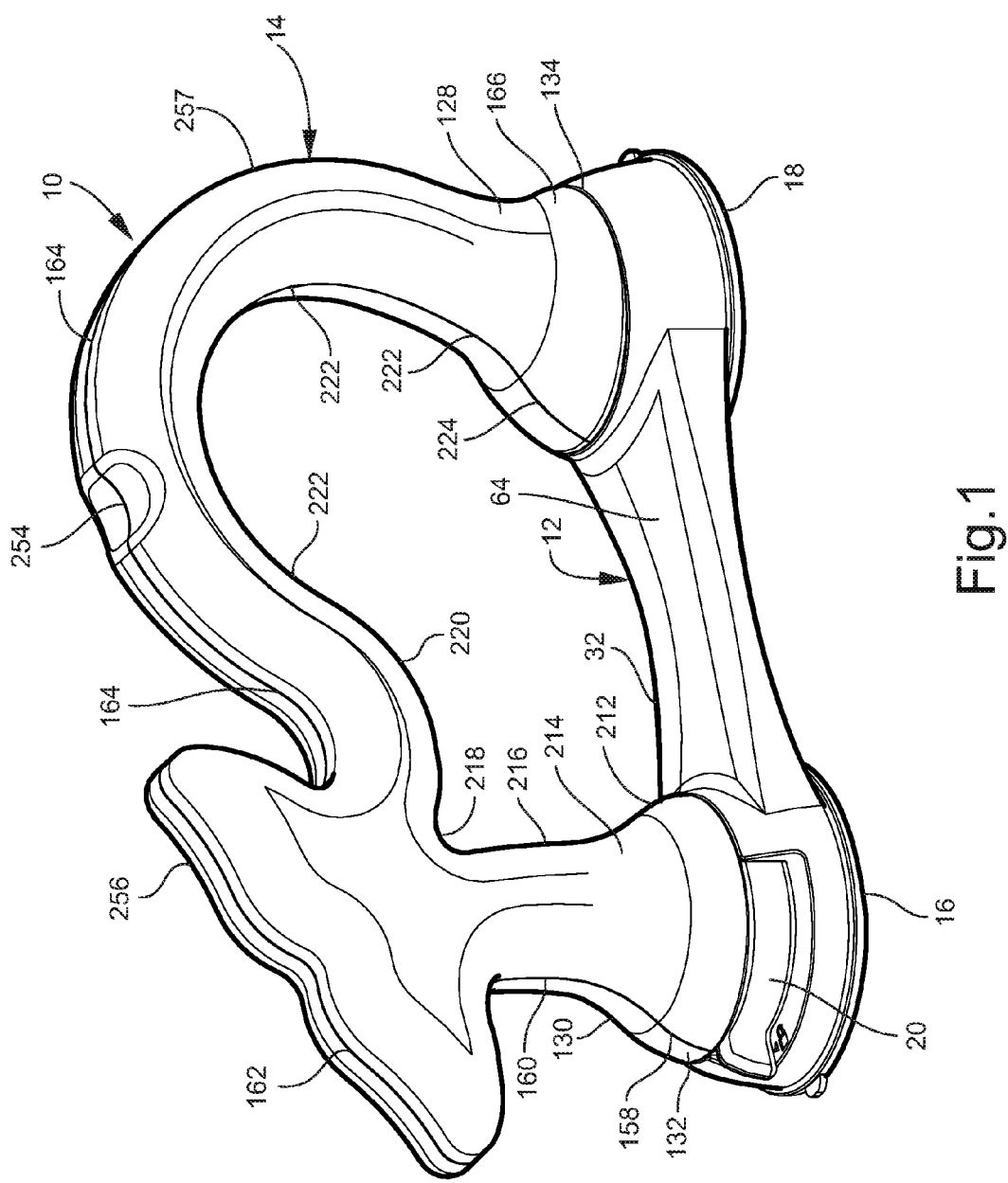
FIG. 1 is a perspective side view of the present bath safety rail.
Figure 2:
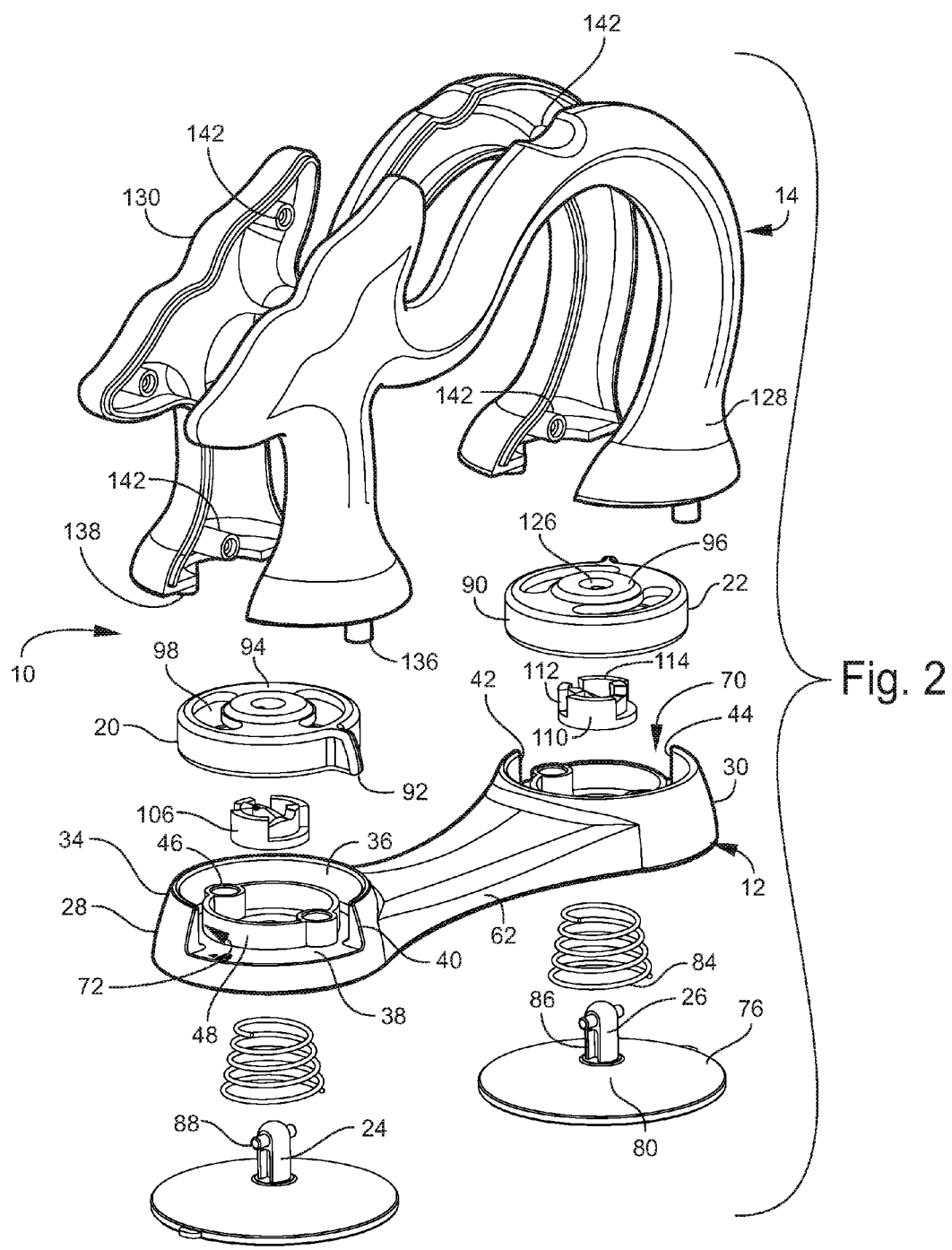
FIG. 2 is an exploded perspective side view of the bath safety rail of FIG. 1.
Figure 3:
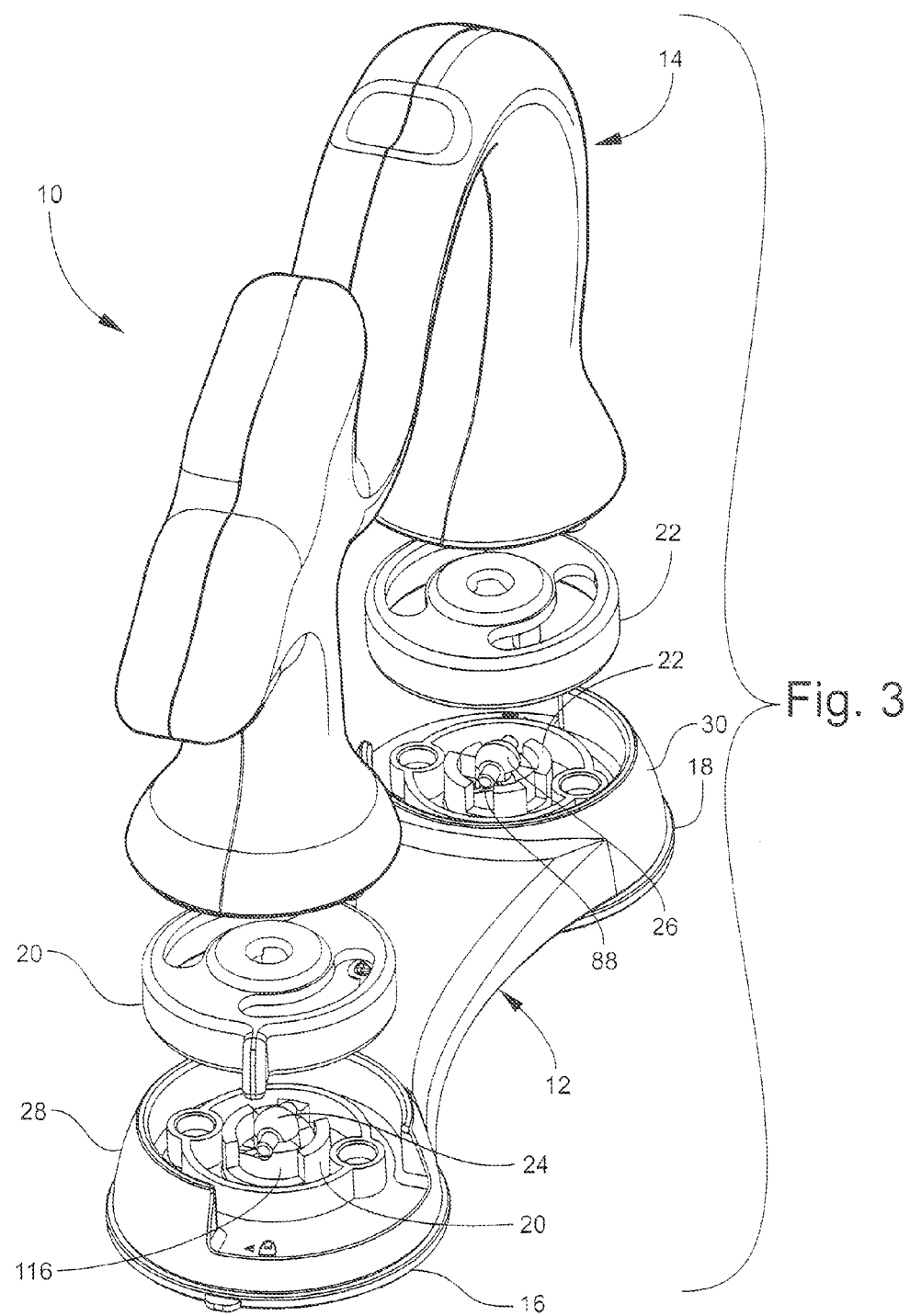
FIG. 3 is an exploded perspective end view of the bath safety rail of FIG. 1.

As shown in FIGS. 1 and 2, reference numeral 10 indicates in general the present bath safety rail. Bath safety rail 10 generally includes a base 12, a handle 14, a first suction cup 16, a second suction cup 18, a first rotating disk or cam 20, a second rotating disk or cam 22, a first stem or cam follower 24, and a second stem or cam follower 26.

More particularly, base 12 includes a first end portion 28, a second end portion 30 and an intermediate portion 32 between the end portions 30 that ties the end portions 30 together and spaces the end portions 30 apart from each other. As shown from above in FIG. 2 and from below in FIG. 4, each of the end portions 28, 30 includes a frustoconical outer wall 34 and a cylindrical inner wall 36. Walls 34, 36 meet at their upper edges. The bottom edge of cylindrical inner wall 36 terminates at a disk shaped floor 38 that also extends to the frustoconical outer wall 34. Walls 34 and 36 and floor 38 in combination form in section a triangular portion 40 that runs annularly about a portion of each of the end portions 28, 30. One end 42 of triangular annular portion 40 is a first stop. A second end 44 of triangular annular portion 40 is a second stop. Each of the end portions 28, 30 includes a pair of diametrically opposite cylindrical bosses 46 that have upper and lower openings, with the lower openings opening through the floor 38.

Bosses 46 are joined by a circular wall 48 rising from floor 38. Wall 48 is coaxial with and runs parallel to inner cylindrical wall 36. Wall 48 is of a lesser height than inner cylindrical wall 36. Wall 48 is spaced from inner cylindrical wall 36. Within wall 48 is a cam follower opening 50 or stem opening 50. Opening 50 is a through opening. Opening 50 is an elongate slot having two parallel opposing sides and two opposing arcuate sides so as to match the cross section of the main body of the cam followers 24, 26. Opening 50 is set in a recess 52 defined by an annular edge. The undersurface of floor 38 and the inner surface of frustoconical outer wall 34 define a relatively large recess or cavity 56 as a whole for receiving suction cups 16, 18. Relatively large recess 56 accepts a large portion of a respective suction cup 16, 18, and relatively small recess 52 and annular edge 54 confine an upper end 58 of a coil spring 60. Coil spring 60 is also accepted by recess 56 and is sandwiched between the upper surface of one suction cup 16, 18 and floor 38. Coil spring 60 is further confined in place by its respective stem 24, 26.

Figure 4:
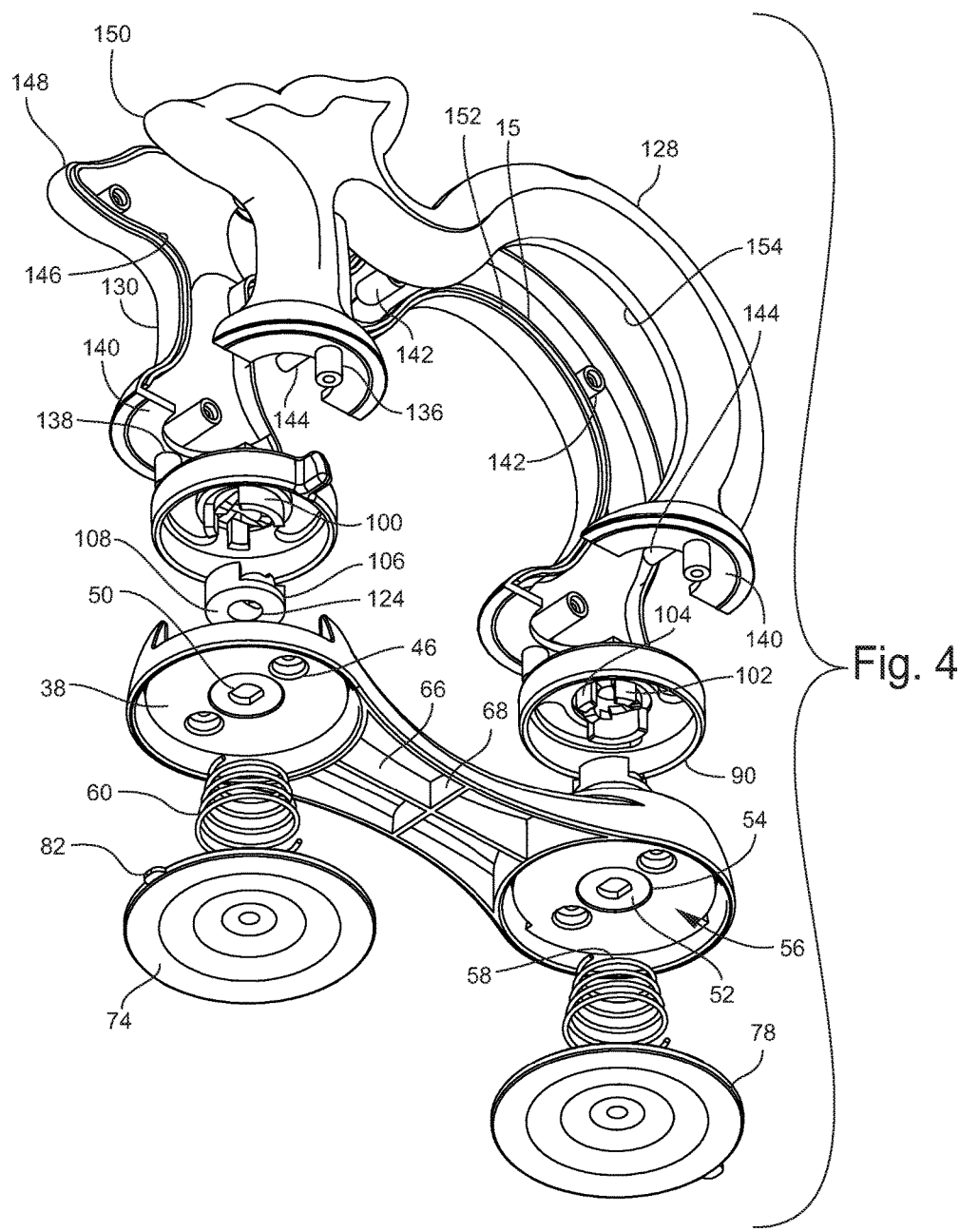
FIG. 4 is an exploded perspective bottom view of the bath safety rail of FIG. 1.
Figure 5:
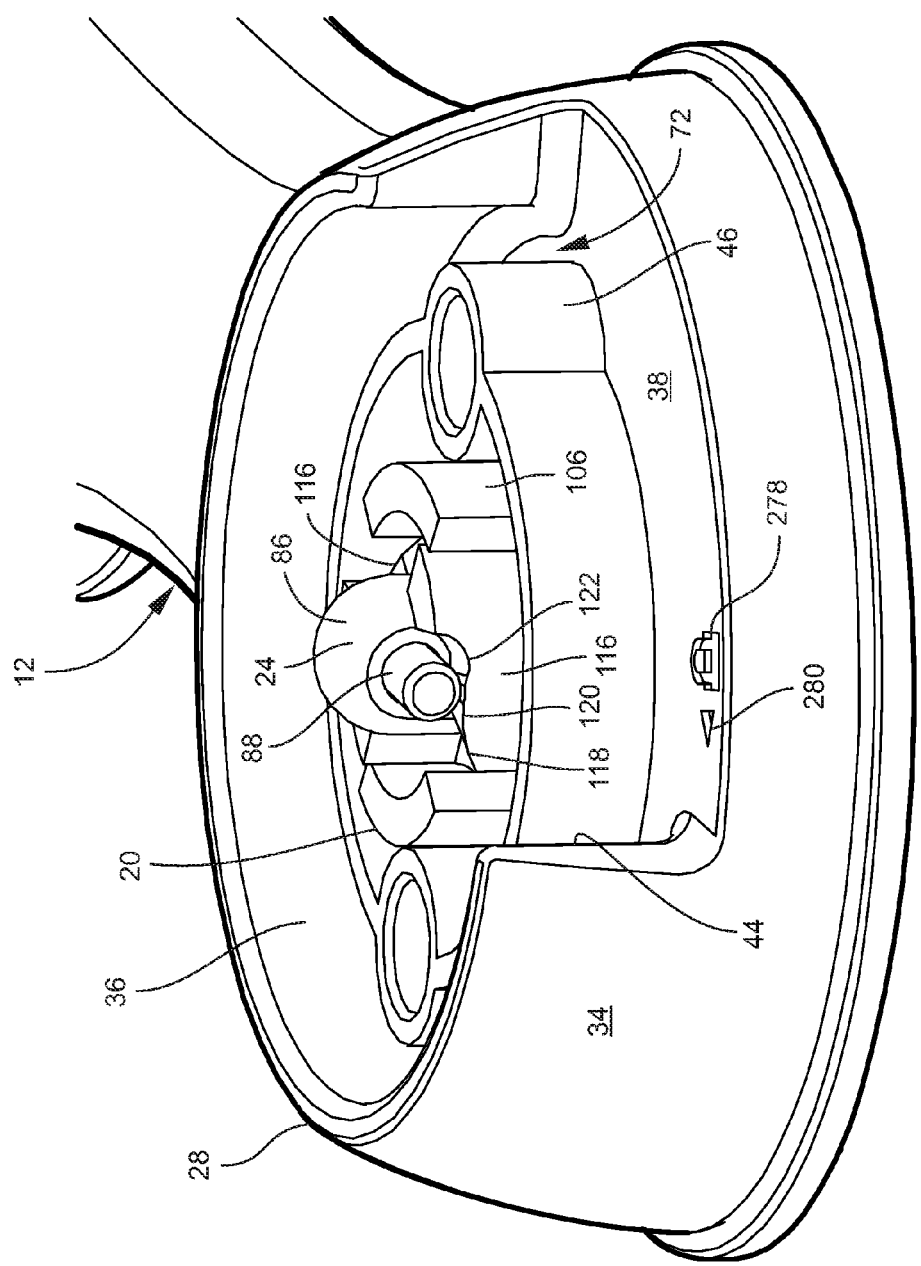
FIG. 5 is a detail perspective view of the cam and cam follower of the bath safety rail of FIG. 1.

Intermediate portion 34 of base 12 includes two opposing inwardly curved sidewalls 62 and an upper surface 64 that curves downwardly from the end portions 28, 30. In other words, intermediate portion 34 of base 12 tapers from each of the end portions 28, 30 in a fashion such that the intermediate portion 34 grows thinner in width and less in height such that a center section of the intermediate portion 34 has a lesser height and lesser width than any other section of the intermediate portion 34. As shown in FIG. 4, intermediate portion 32 includes an internal first rib 66 extending longitudinally from end portion 28 to end portion 30 and an internal second rib 68 extending laterally from side 62 to side 62. Ribs 66, 68 form a junction with each other at, and define, the center section of the intermediate portion 34. Ribs 66, 68 are upright, just like sides 62, inner wall 36, circular wall 68, and frustoconical outer wall 34 are upright. Rib 66 extends from frustoconical wall 34 of one end portion 28 to the frustoconical wall 34 of the other end portion 30.

Stops 42, 44 define a slot 70 therebetween. Slot 70 is also defined by floor 38. Slot 70 is an opening in each of walls 34, 36. If the absolute outer end of end portion 28 is defined as the twelve o'clock position, then slot 70 in end portion 28 is between the nine o'clock and twelve o'clock position. If the absolute outer end of end portion 30 is defined as the twelve o'clock position, then slot 70 of end portion 30 is between the nine o'clock position and the twelve o'clock position. Slot 70 extends for a ninety degree arc about each of walls 34, 36. Slot 70 of end portion 28 is formed on one side of the base 12 and slot 70 of the end portion 30 is formed on the other side of base 12.

The spacing between wall 48 and wall 36 defines a track 72 therebetween. Track 72 is further defined by floor 38. Track 72 is interrupted by bosses 46 partially protruding into track 72. Cams 20, 22 rotate in and are guided by track 72.

Each of suction cups 16, 18 includes a first surface or underside 74 that engages a surface, such as a smooth or flat surface. The top surface of the wall of the bathtub is such a surface. The tiled vertical wall of a shower is such a surface. Each of the suction cups 16, 18 includes a second or upper surface 76 that confronts the base 12. Between the underside 74 and upper surface 76 is an annular edge or periphery 78. Whether the suction cups 16, 18 are under pressure and in an operational state or under no pressure, periphery 78 lies in a plane.

Each of the suction cups 16, 18 includes a central portion 80. The central portion 80 is receivable into the end portion cavities 56. The periphery 78 of the suction cups 16, 18 lie outside the cavities 56 and underneath and outside of the frustoconical outer walls 34. Each of the suction cups 16, 18 includes a finger nail tab 82 for being lifted to provide air flow into the respective suction cup 16 or 18 to release the suction therein. In the relaxed state, under no hand pressure and under no pressure from the weight of the bath safety rail 10 as a whole, suction cups 16, 18 have a slight spherical shape. When the bath safety rail 10 is set upright on a smooth surface, the weight of the bath safety rail 10 pushes down on the suction cups 16, 18 and pushes air out from between the undersurface 74 of the suction cups 16, 18 and the smooth surface such that the suction cups 16, 18 will bind to the smooth surface. Exerting hand pressure upon the bath safety rail 10 pushes even more air out from between the undersurface 74 of the suction cups 16, 18 and the smooth surface to create even a greater bond between the bath safety rail 10. Operating the cams 20, 22 and the cam followers 24, 26 to draw up the central portions of the suction cups 16, 18 creates even a greater bond by providing more space underneath the suction cups 16, 18 for a the same amount of gas (air).

Coil spring 60 includes a lower end 84 that confronts and rests upon the upper surface 76 of the suction cups 16, 18. Coil springs 60 counter the action of the cams 20, 22 that draw up the cam followers 24, 26 that in turn draw up the central portions 80 of the suction cups 16, 18 such that central portions 80 of the suction cups 16, 18 remain spaced from the floors 38 of the end portions 28, 30 and such that resistance is provided to a turning of the cams 20, 22 in either rotation of direction.

Stems or cam followers 24, 26 extend upwardly and are disposed on an axis of their respective suction cups 16, 18. Cam followers 24, 26 are coaxial with the periphery 78 of their respective suction cup 16, 18 and are further coaxial with coil springs 60, frustoconical outer wall 34, cylindrical inner wall 36, wall 48, and cams or rotating disks 20, 22. Each of the cam followers 24, 26 are one-piece with their respective suction cup 16, 18. Suction cups 16, 18 may be formed of a flexible elastomeric material. Cam followers 24, 26 may be formed with a rigid plastic material.

Each of the cam followers 24, 26 includes a coaxial main body portion 86 that is connected to its respective suction cup 16, 18. The cross section of the main body portion 86 is elongate so as to match the elongate slot like opening 50 such that main body portion 86 does not spin relative to the end portions 28, 30 or relative to the floor 38 or relative to the opening 50.

Each of the cam followers 24, 26 further includes a crosspiece or crosswise portion 88 that extends beyond each of the sides of the main body portion 86 so as to have two ends. Each of the ends of the crosswise portion 88 engages its respective cam 20, 22. Crosspiece 88 may be formed of a rigid plastic material and may be formed of the same material as the main body portion 86. Crosspiece 88 is set at a right angle to the main body portion 86.

Each of the first and second cams 20, 22 includes an outer circular wall 90. Wall 90 rides in track 72 formed between walls 36 and 48 as cams 20, 22 rotate. A finger tab 92 projects radially from outer circular wall 90. Finger tab 92 may be pushed with a finger to and between stops 42 and 44. Stops 42, 44 are stops for the finger tab 92.

Each of the first and second cams 20, 22 further includes a ceiling 94 having a boss 96 elevated slightly above the ceiling 94. Ceiling 94 is interrupted by a pair of arcuate through slots 98 diametrically opposing each other. Depending from boss 96 are a set of three annular or circular walls 100, 102, 104. Wall 100 is relatively long in length. Walls 102, 104 are relatively short in length.

Boss 96 mounts from above a ramp base 106. Each of the ramp bases 106 is part of its respective cam 20, 22. Ramp base 106 is fixed, such as by welding or epoxy or snap friction fit, in its respective cam 20, 22. Ramp base 106 includes a floor 108 and three circular walls 110, 112, 114 rising from the floor 108. Walls 110, 112, 114 interlock with walls 100, 102, 104 such that, during assembly ramp base 106 can be placed within wall 48 on floor 38, then the cam follower 24, 26 can be inserted upwardly into the ramp base 106, then the main part of the cam 20, 22 having the boss 96 can be snapped onto or interlocked with ramp base 106.

Within the circular walls 110, 112, 114, the ramp base 106 includes a pair of ramps 116 that are on the axis of the suction cups 16, 18 and are coaxial with the periphery 78 of the suction cups 16, 18, the circular wall 48, the inner wall 36, and the outer circular wall 90 of the cams 20, 22. Ramp 116 includes a ramp surface 118 that rises incrementally from the floor 108 to a top side 120. While the ramp surface 118 rises, the ramp surface 118 also winds annularly about the axis of its respective suction cup 16, 18. From the top side or peak 120, the ramp surface 118 runs or drops into a dip or receiver 122 having a lesser elevation than the top side or peak 120. The dip or recess 122 accepts the crosswise portion or piece 88 of the respective stem 24, 26. Ramp 116 includes the upper end or peak 120 spaced from the plane of the suction cup periphery 78 by a first distance. The bottom of the receiver or dip 122 is spaced from the plane of the suction cup periphery by a second distance that is less than the first distance. The upper end portion 120 of the ramp 116 leads into and includes the receiver or dip 122 such that, after the first crosswise piece 88 travels up the ramp 116, the first crosswise piece 88 is drawn downwardly into the receiver or dip 122 by pressure from the respective suction cup 16, 18 and/or coil spring 60 so as to minimize the chances that the crosswise piece 88 travels back down the ramp 116 and maximize the chances of retention of suction by the respective suction cup 16, 18.

Ramp base 106 includes a through opening 124. Cam follower 24 or 26 passes through this through opening 124.

Boss 96 includes a through opening 126. During assembly of the two parts of cam 20 or 22, where the two parts are a) the main body of the cam 20 or 22 having circular wall 90 and b) the ramp base 106, one may look through opening 126 to make sure that the crosspiece 88 is seated correctly on ramps 116 when the ramp base 106 is connected to the main body of the cam 20 or 22.

Handle 14 includes a first half section 128 and a second half section 130. Handle 14 includes a first end 132 and a second end 134. The first handle end 132 opposes first cam 20 and first suction cup 16. The second handle end 134 opposes the second cam 22 and second suction cup 18. Each of the handle ends 132, 134 includes a pair of legs or cylindrical fastener acceptors 136, 138. Each of the legs 136, 138 depends from a flat semi-circular underside 140. Legs 136, 138 extend through respective arcuate slots 98 and are received in or mounted on respective bosses 46. A fastener pin then extends upwardly through boss 46 and into one of the legs 136, 138. Four fastener pins in total are used to tie the handle 14 to the base 12. Handle 14 is connected to base 12 and, at the same time, cams 20, 22 may be rotated therein. Tab 92 may be slid back and forth between stops 42, 44. When tab 92 is at the stops 42, 44, legs 136, 138 may be at one of the ends of the arcuate slots 98 such that the ends of the arcuate slots 98 act as stops also to stop the rotation of one of the cams 20, 22 and thus stop the drawing up of the suction cup 16, 18 by the cam follower 24, 26.

Handle half section 130 includes a set of boss or cylindrical fastener receivers 142. Receiver 142 includes an open end on the outside surface of the handle half section 130. Handle half section 128 includes a set of boss or cylindrical fastener receivers 144. Each of the receivers 144 line up with a respective receiver 142. Receivers 144 have no opening on the outside surface of the handle section 128. A pin fastener is inserted from the outside of handle section 130 into receiver 142 and further into receiver 144. Depending on the type of handle 14, there may be five or more sets of cooperating receivers 142, 144.

The half sections 128, 130 are opposing pieces. The half sections 128, 130 have outer or exterior surfaces that are mirror images of each other. The inner surfaces of the half sections 128, 130 are generally mirror images of each other except that a) fastener receiver 144 may have a lesser diameter than fastener receiver 142 and slip inside of fastener receiver 142 and b) half section 130 includes a sealing inner lip 146 that runs immediately inwardly of inner edge 148.

Base 12 includes a first longitudinally extending center plane that splits the base 12 into two half sections. This center plane is on the axis of each of the cam followers 24, 26. This cam follower axis is shared by the suction cups 16, 18, the central portion of the suction cups 16, 18, the periphery 78 of each of the suction cups 16, 18, and the inner wall 36. The first longitudinally extending center plane also splits the opposing half sections 128, 130 of the handle 14. The junction where the opposing half sections 128, 130 meet defines this center plane. This center plane runs at a right angle to a second suction cup edge plane defined by the peripheral edges 78 of the suction cups 16, 18, whether the suction cups 16, 18 are at rest or are in operation.

Handle edge 148 of half section 130 confronts the first center plane from first end portion 28 of the base 12 to the second end portion 30 of the base 12. A handle edge 150 on half section 128 opposes handle edge 148 and confronts the first center plane from the first end portion 28 of base 12 to the second end portion 30 of the base 12.

Half section 130 includes another handle edge 152. Immediately inwardly of this handle edge 152 is an inner lip 156. Half section 128 includes another handle edge 154. When the handle 14 is assembled, handle edges 152, 154 abut and confront each other on the first center plane. Immediately inwardly is the sealing inner lip 156 that traverses the first center plane from the half section 130 to the half section 128.

When the handle half sections 128, 130 are fixed together, handle inner edges 148, 150 confront and abut each other and form a junction. This junction is on the first center plane. Inner lip 146 is tucked immediately inwardly of this junction and traverses the junction from the half section 130 to the half section 128.

Handle edges 148, 150 are outer edges. Handle edges 152, 154 are inner edges.

The outer or exterior surface of the first end 132 of handle 14 tapers inwardly and upwardly. The diameter of the first end 132 is equal to or slightly less than the diameter of the frustoconical outer wall 34 such that the transition from the base 12 to the handle 14 is gradual and smooth. The frustoconical outer wall 34 is a tapering inwardly and upwardly and this inward and upper taper continues with the exterior surface of the first end 132 of the handle 14. This gradual and smooth tapering is also found at the second end 134 of the handle 14, where the frustoconical wall 34 of handle end 134 is by definition an upwardly and inward taper and where this upward and inward taper continues on the exterior surface of the handle end 128, and where the diameter of second end 134 is equal to or slightly less than the diameter of the frustoconical wall 34 of handle end 134.

If the second suction cup edge plane is horizontal, then the junction between outer handle edges 148 and 150 in the first center plane from base end portion 28 to base end portion 30 includes an inwardly and upwardly extending section 158, which leads into an upwardly extending section 160, which leads into a dovetail section 162, which leads into an undulating section 164, which leads into a downwardly and outwardly extending section 166. The undulating section 164 includes three oppositely turning U-shaped portions. The undulating section 164 includes, beginning from the dovetail section 162, a first U-shaped section which leads into a second oppositely turning U-shaped section, which leads into a third oppositely turning U-shaped section that resembles a blowhole of a whale, which leads into a fourth oppositely turning U-shaped section, which leads into a fifth oppositely turning U-shaped section.

Figure 6:
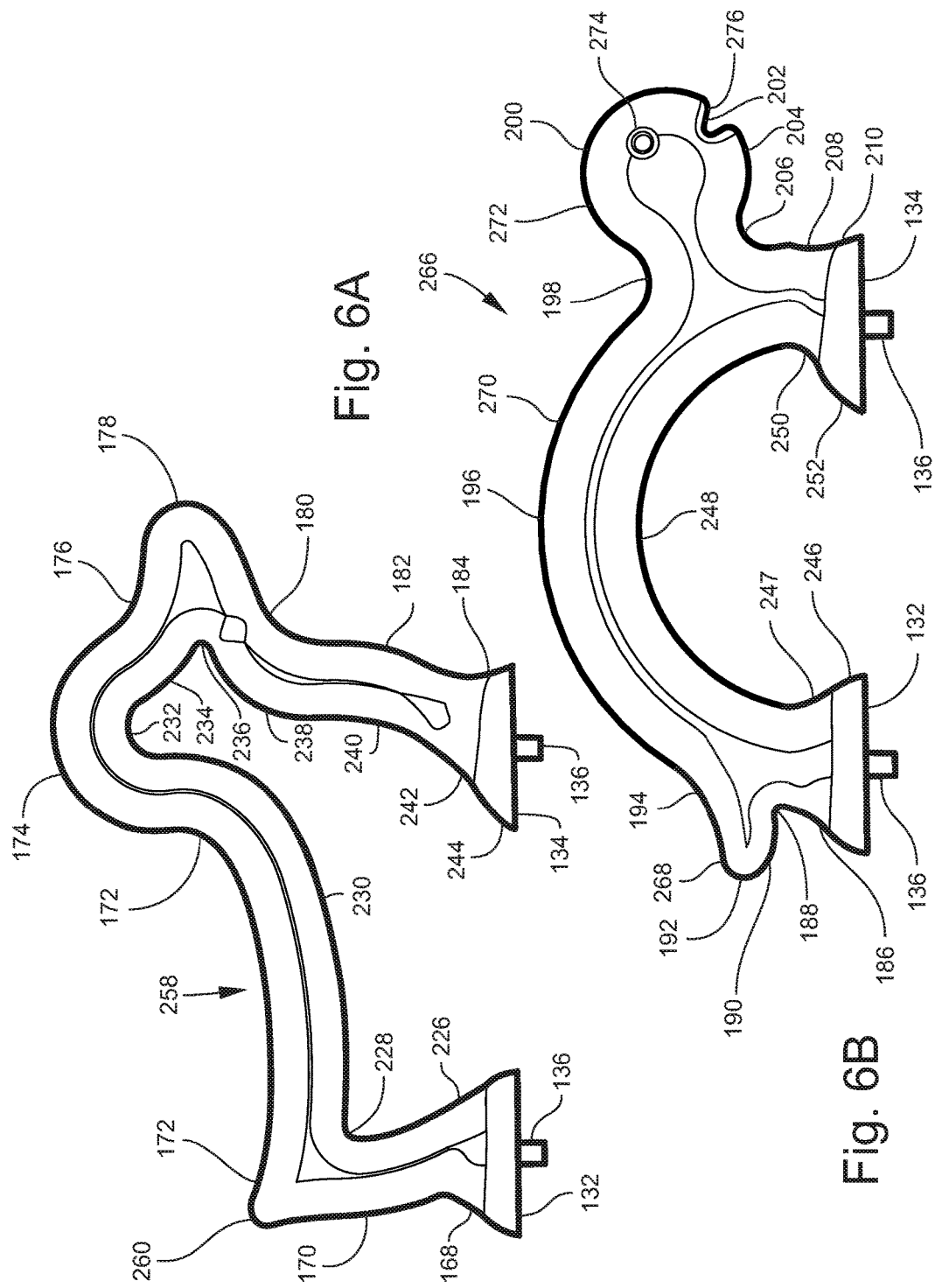
FIG. 6A is side view of a first alternate handle for the bath safety rail of FIG. 1.
FIG. 6B is a side view of a second alternate handle for the bath safety rail of FIG. 1.
Figure 7:
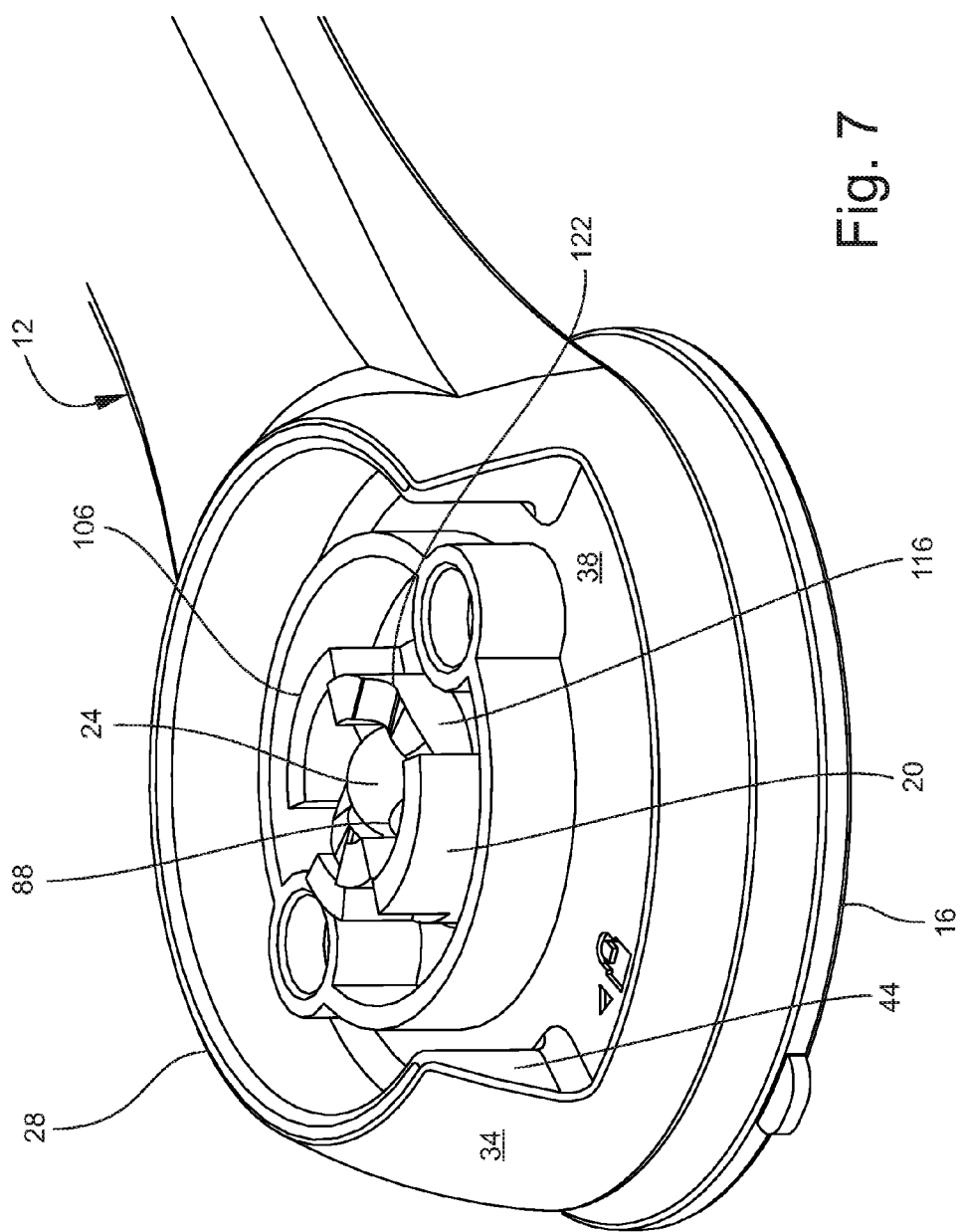
FIG. 7 is a detail perspective view of the cam and cam follower of the bath safety rail of FIG. 1, showing the cam follower in an unlocked position.
Figure 8:
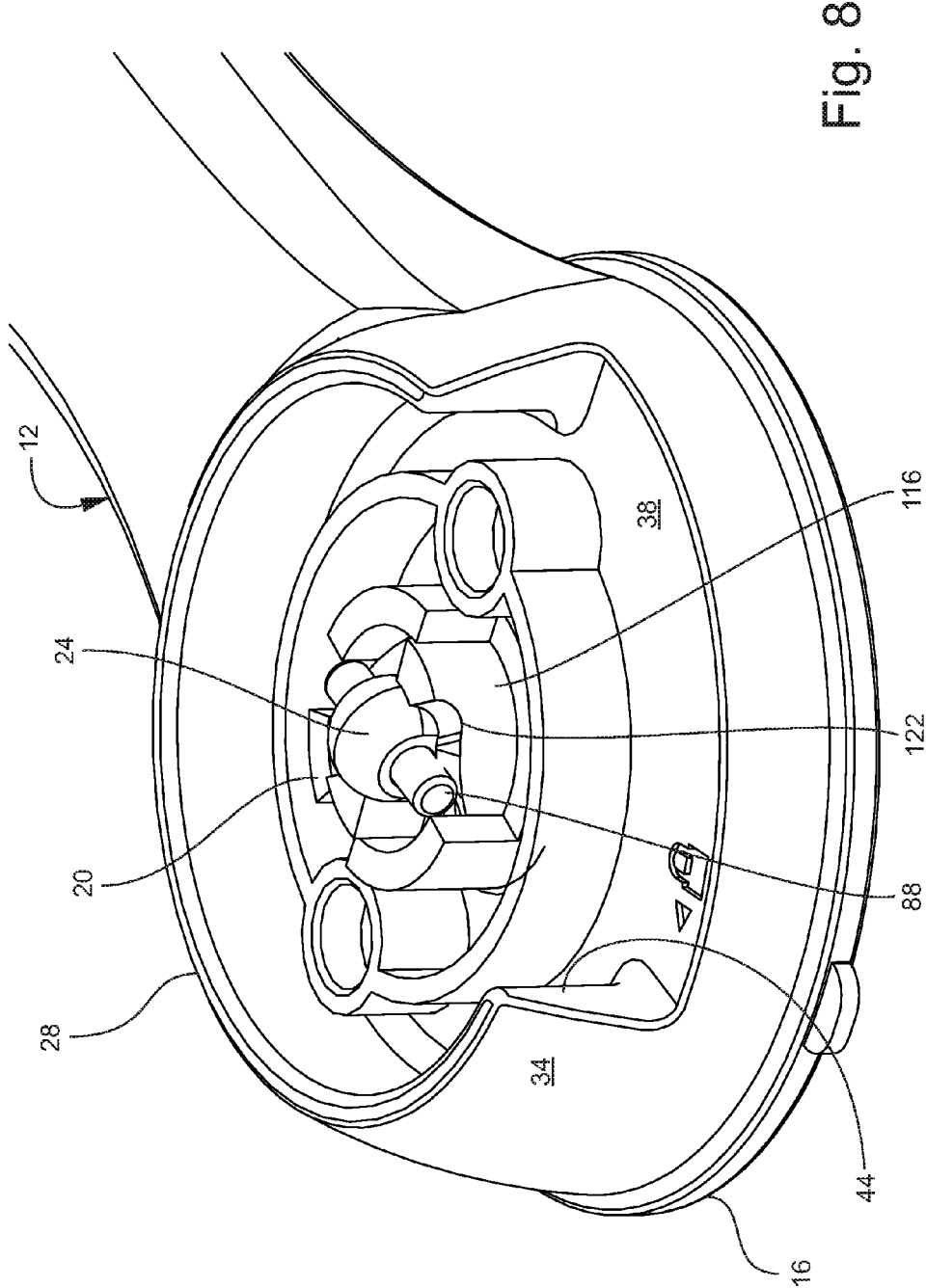
FIG. 8 is a detail perspective view of the cam and cam follower of the bath safety rail of FIG. 1, showing the cam follower in a position midway between the unlocked and locked position.
Figure 9:
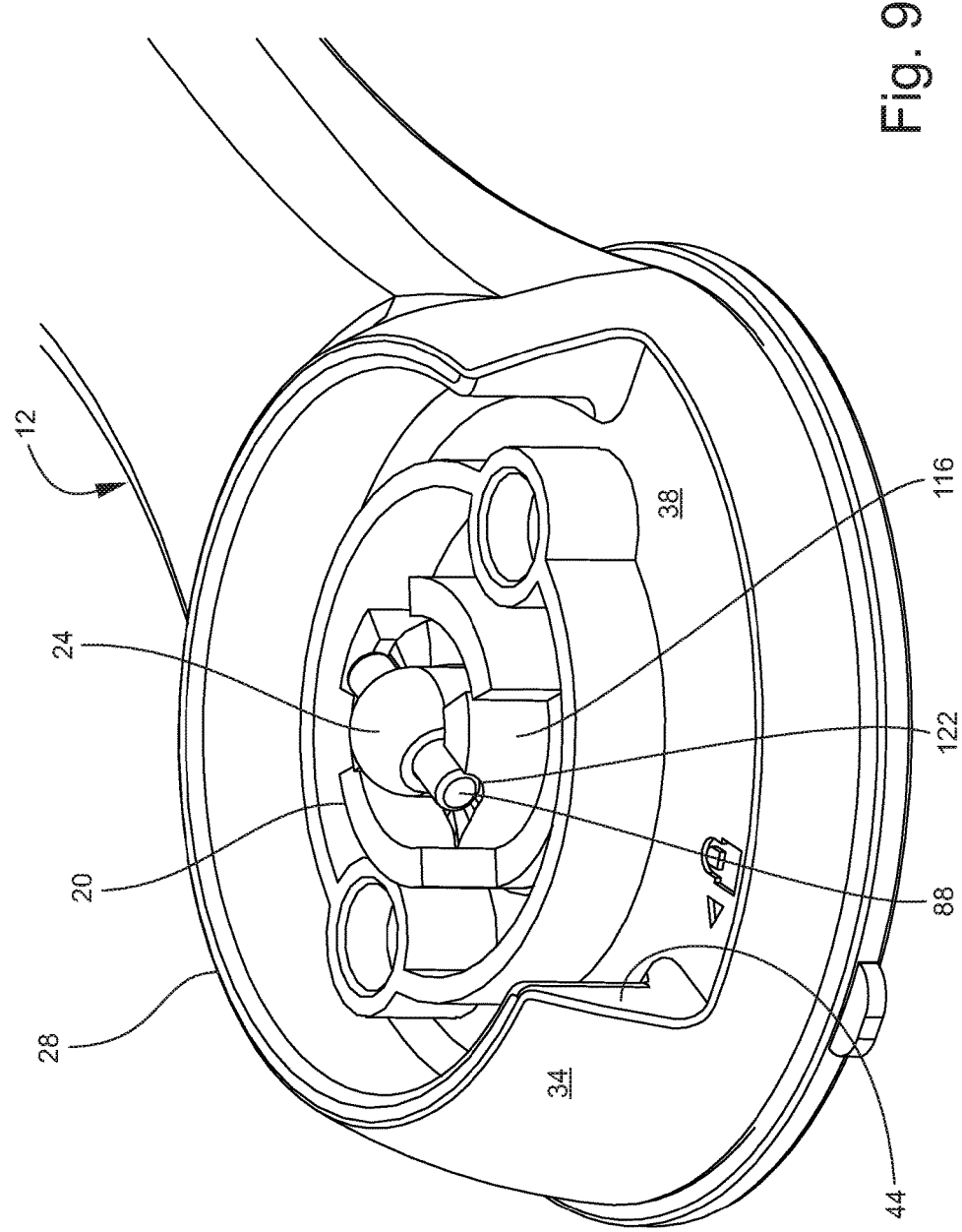
FIG. 9 is a detail perspective view of the cam and cam follower of the bath safety rail of FIG. 1, showing the cam follower in a locked position.

In another handle embodiment, as shown in FIG. 6A, if the second suction cup edge plane is horizontal, then the junction between outer handle edges 148 and 150 in the first center plane from base end portion 28 to base end portion 30 includes an upwardly and inwardly extending section 168, which leads into an outwardly and upwardly extending section 170, which leads into a U-shaped section 172, which leads into an oppositely turning U-shaped section 174, which leads into an oppositely turning U-shaped section 176, which leads into an oppositely turning U-shaped section 178, which leads into an oppositely turning U-shaped section 180, which leads into an inwardly and downwardly extending section 182, which leads into an outwardly and downwardly extending section 184.

In another handle embodiment, as shown in FIG. 6B, if the second suction cup edge plane is horizontal, then the junction between outer handle edges 148 and 150 in the first center plane from base end portion 28 to base end portion 30 includes an upwardly and inwardly extending section 186, which leads into a U-shaped section 188, which leads into an oppositely turning U-shaped section 190, which leads into a same way turning U-shaped section 192, which leads into an oppositely turning U-shaped section 194, which leads into an oppositely turning U-shaped section 196, which leads into an oppositely turning U-shaped section 198, which leads into an oppositely turning U-shaped section 200, which leads into an oppositely turning U-shaped section 202, which leads into an oppositely turning U-shaped section 204, which leads into an oppositely turning U-shaped section 206, which leads into a same way turning U-shaped section 208, which leads into a downwardly and outwardly extending section 210.

In the handle embodiment of FIG. 1, if the second suction cup edge plane is horizontal, then the junction between inner handle edges 152, 154 in the first center plane from base end portion 28 to base end portion 30 includes an upwardly and inwardly extending section 212, which leads into a U-shaped section 214, which leads into an upwardly extending section 216, which leads into a U-shaped section 218, which leads into an oppositely turning U-shaped section 220, which leads into an oppositely turning U-shaped section 222, which leads into an oppositely turning U-shaped section 224.

In the handle embodiment of FIG. 6A, if the second suction cup edge plane is horizontal, then the junction between inner handle edges 152, 154 in the first center plane from base end portion 28 to base end portion 30 includes an upwardly and inwardly extending section 226, which leads into a U-shaped section 228, which leads into an oppositely turning U-shaped section 230, which leads into an oppositely turning U-shaped section 232, which leads into an oppositely turning U-shaped section 234, which leads into an oppositely turning U-shaped section 236, which leads into an oppositely turning U-shaped section 238, which leads into an oppositely turning U-shaped section 240, which leads into a same way turning U-shaped section 242, which leads into an oppositely turning U-shaped section 244.

In the handle embodiment of FIG. 6B, if the second suction cup edge plane is horizontal, then the junction between inner handle edges 152, 154 in the first center plane from base end portion 28 to base end portion 30 includes a U-shaped portion 246, which leads into an oppositely turning U-shaped portion 247, which leads into a same way turning U-shaped portion 248, which leads into a same way turning U-shaped portion 250, which leads into an oppositely turning U-shaped portion 252.

The handle 14 in FIG. 1 is in a shape of a whale. Handle 14 includes a blowhole 254, a fin 256, and a head 257. Handle 14 includes first and second ends or end portions 132, 134. Handle 14 in FIG. 1 further includes a first handle or rail portion extending from the first end 132 that is straight and is on one of 1) on the first axis, and 2) parallel to the first axis. Sections 160 and 216 are on this first rail portion. Handle 14 further includes a second handle portion extending from the second end 134 that is oblique relative to the first axis that runs through cam follower 24. This second handle portion includes sections 164, 166, 222 and 224. Handle 14 further includes a third handle portion that extends from the first handle portion and is generally in the shape of a dovetail. This dovetail includes section 162. Handle 14 further includes a fourth handle portion that extends between and undulates between the second and third handle portion. This fourth handle portion includes sections 164, 218, 220, and 222.

Handle 258 in FIG. 6A is in a shape of a duck having a tail 260, a head 262, and a bill or beak 264. Handle 258 includes first and second ends or end portions 132, 134. Handle 258 includes a first handle portion extending from the first end portion 132 and includes section 168, 170, 226 and 228. Handle 258 includes a second handle portion that extends crosswise relative to the first handle portion in the direction of the second end portion 134 of the handle 258. This second handle portion includes sections 172, 228, and 230. Handle 258 includes a third handle portion extending from the second handle portion in the direction of the second end portion 134 and further extends away from the base 12. This third handle portion includes sections 172, 174, 230 and 232. Handle 258 further includes a fourth handle portion that extends from the third handle portion and extends away from the base 12 to form a peak. This fourth handle portion includes sections 174 and 232. Handle 258 includes a fifth handle portion extending from the fourth handle portion to a location that is further away from the first axis extending through cam follower 24 than the second end portion 134 of the handle 258. The fifth handle portion includes section 176, 178, 180, 234, 236 and 238. Handle 258 further includes a sixth handle portion that extends from the fifth handle portion and back in a direction toward the first axis extending through the cam follower 24 to the second end portion 134 of the handle 258. This sixth handle portion includes sections 182, 184, 240, 242 and 244.

Handle 266 in FIG. 6B is in the shape of a turtle having a tail 268, a shell 270, a head 272, eyes 274, and mouth 276. The outer U-shaped section 196 of handle 266 extends from one end portion 132 to the other end portion 134. The inner U-shaped section 248 extends from one end portion 132 to the other end portion 134. Handle 266 includes first and second ends or end portions 132, 134. Handle 266 further includes a first handle portion extending from the first end 132 that is straight and is one of 1) on the first axis of the cam follower 24, and 2) parallel to the first axis of the cam follower 24. The first handle portion includes sections 186, 188, 246, 247. Handle 266 further includes a second handle portion extending from the second end 134. The second handle portion extends in a direction away from the first axis and in a direction away from the second end 134. The second handle portion includes sections 188, 190, 192, and 194. Handle 266 further includes a third handle portion that extends from the second handle portion is formed in the shape of an arc. The third handle portion includes sections 194, 196, 198, 246, 247, 248, 250 and 252. Handle 266 further includes a fourth handle portion that extends from the third handle portion and extends to a location that is further away from the first axis than the second end 134. The fourth handle portion includes section 198, 200, 202, 204, and 206. Handle 266 includes a fifth handle portion that extends from the fourth handle portion to the second end 134. The fifth handle portion includes sections 206, 208, 210, 250 and 252.

In operation, the cams 20, 22 are rotated to the unlocked position where tabs 92 abut the stops 42. These stops 42 are spaced from the longitudinal axis of the base 12. The rotation of the cams 20, 22 to the unlocked position permits the crosspieces 88 of the cam followers 24, 26 to drop in a linearly vertically fashion down ramps 116 in a straight line to the lowest portion of the ramp 116. The rotation of the cams 20, 22 permits the coil springs 60 to push the suction cups 16, 18 to a planar position or to a position that the closest possible to a planar position given the curvature of the undersurface 74 when unbiased. The unlocked position is shown in FIG. 10A. Then the bath safety rail 10 is placed on a smooth surface where it is desired for helping advance the safety of its environment, such as a bathroom. Then the tabs 92 are pushed away from the stops 42 and in the direction of the stops 44. As the tabs 92 are pushed away from the stops 42, the crosspieces 88 of the cam followers 224 are drawn up in a straight line linearly vertically fashion by the ramps 116. The cam followers 24, 26 in turn draw up the central portions 80 of the suction cups 16, 18 and create a negative pressure between the suction cups 16, 18 and the smooth surface. FIG. 10B shows a location where the cam follower 24 has been drawn up the ramp 116 about one-half way. Immediately prior to the tabs 92 reaching stops 44, the crosspieces 88 reach the peak 120 and here the greatest suction is attained. This point is shown in FIG. 10C. When the cams 20, 22 are rotated to the locked position where the tabs 92 abut the stops 44, the crosspieces 88 drop linearly or in a straight line into the dip 122—felt by the user through the cams 20, 22—and the suction in the suction cups 16, 18 becomes slightly less as the cam followers 24, 26 drop slightly in elevation and permit the central portion 80 of the suction cups 16, 18 to drop in elevation slightly. This point is shown in FIG. 10D. Here tabs 92 and stops 44 are on or confront the longitudinal axis of the base 12. When the crosspieces 88 are in the dips 122, the bath safety rail 10 is locked; the chances of the crosspieces 88 dropping in a linear or straight line fashion and pushing the ramps 116 to rotate the cams 20, 22 are minimized. Then, to release the bath safety rail 10, the cams 20, 22 are rotated away from the stops 44 by pushing on tabs 92 and, as the cams 20, 22 are rotated, the user can feel the rise of the crosspieces 20, 22 from the dips 122 to the peak 120. Then the cams 20, 22 are further rotated and the ramps 116 drop the crosspieces 88 to their lowest level, as shown in FIG. 10A, where a low level suction may still exist between the undersurfaces 74 of the suction cups 16, 18, but where a user may easily remove the bath safety rail 10 from the smooth surface.

When the bath safety rail 10 is anchored in place, as shown in FIG. 10D, a user may grip handle 14 anywhere on the handle 14, such as on the fin 256 or dovetail portion defined by section 162, or on the handle portion defined by sections 164 and 222, or on the handle portion defined by sections 160, 216, or on the handle portion defined by sections 166, 224. A user may grip the handle 14 or handle portions when, for example, the user is climbing in or out of the bathtub.

It should be noted that first and second icons 278, 280 may be molded into the floor 38 of the base 12 adjacent to stops 44. First icon 278 is formed in the shape of a padlock. Second icon 280 is formed in the shape of an arrow pointing in the direction of its respective stop 44. Instead of being molded into floor 38, the first and second icons 278, 280 may be decals placed on the floor 38 with pressure sensitive adhesive.

Handles 14, 258, and 266 are formed of plastic. Handles 14, 258, 266 are molded plastic parts. Base 12 is formed from plastic and is a molded plastic part. Suction cups 16, 18 are formed from an elastomer or rubber like material and are flexible. Cam followers 24, 26 are plastic.

It should be noted that coil spring 60 is unnecessary. Its removal does not affect the operation or function of the product or any other component. That is, without coil spring 60 being present, the turning of the locking tabs or disks or cams 20, 22 draws their respective suction devices or cups 16, 18 upwardly (or inwardly to create suction) when turned clockwise and pushes the suction devices or cups 16, 18 downwardly (or outwardly to destroy suction) when turned counter-clockwise. Also, small recess 52 and annular edge 54, for confining the upper end 58 of coil spring 60, may be removed with spring 60 such that the undersurface of floor 38 proceeds in a smooth fashion from its outer perimeter to an innermost portion that terminates at opening 50.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A bath safety rail for being engaged to and disengaged from a bath surface, comprising:
   a) a base;
   b) a handle on the base;
   c) a first suction cup confronting the base, the first suction cup having a first surface that engages said bath surface and a second surface that confronts the base, the first suction cup having a first central portion and a first axis extending through the first central portion, the first suction cup further having a first periphery, the first periphery being in a first plane and the first axis being at a right angle to the first plane;

d) a first cam follower engaged to the first central portion of the first suction cup and extending from the second surface of the first suction cup;
e) a first cam in the base and engaging the first cam follower, the first cam being turnable on the first axis, the first cam drawing the first cam follower away from the plane when the first cam is turned to draw the first suction cup tight and create a greater negative pressure between the bath surface and the first surface of the first suction cup; and
f) wherein the handle engages the base through the first cam, the handle being engaged to the base with a first fastener, the first cam having a first through slot through which the first fastener extends, the first through slot having the first axis such that the first cam may turn about the first axis and relative to the first fastener.

2. The bath safety rail of claim 1, wherein the first cam follower includes a first coaxial portion that is coaxial with said first axis of said first suction cup and a first crosswise portion that extends crosswise relative to the first coaxial portion, the cam engaging the first crosswise portion.

3. The bath safety rail of claim 2, wherein the first cam includes a first rotating piece in the base, the first rotating piece being turnable on the first axis, the first rotating piece having a first ramp disposed obliquely relative to said first plane, the first ramp engaging the first crosswise portion of the first cam follower and drawing the first cam follower away from the plane when the first rotating piece is turned to draw the first suction cup tight and create a greater negative pressure between the bath surface and the first surface of the first suction cup.

4. The bath safety rail of claim 3, wherein the first rotating piece further comprises a first receiver for the first crosswise portion of the first cam follower, wherein the first ramp includes an upper end spaced from the first plane by a first distance, wherein the first receiver is spaced from the first plane by a second distance that is less than the first distance, and wherein the upper end of the first ramp leads into the first receiver such that, after the first crosswise piece is drawn linearly up the first ramp, the first crosswise piece is drawn linearly downwardly into the first receiver by pressure from the first suction cup so as to minimize the first crosswise piece from dropping back down the first ramp and so as to maximize retention of suction by the first suction cup.

5. The bath safety rail of claim 1, wherein the first cam further comprises a first receiver for a portion of the cam follower, wherein the first cam includes an upper end spaced from the first plane by a first distance, wherein the first receiver is spaced from the plane by a second distance that is less than the first distance, and wherein the upper end of the first cam leads into the first receiver such that, after the portion of the cam follower is drawn linearly up the first cam, the portion of the first cam follower is drawn linearly downwardly into the first receiver by pressure from the first suction cup so as to minimize the portion of the first cam follower from dropping linearly down and so as to maximize retention of suction by the first suction cup.

6. The bath safety rail of claim 1, wherein the handle includes first and second ends and the base extends between the first and second ends, and further comprising a second suction cup, a second cam follower and a second cam.

7. The bath safety rail of claim 6, wherein the first end of the handle opposes the first cam and wherein the second end of the handle opposes the second cam.

8. The bath safety rail of claim 3, wherein the first rotating piece includes first and second ramps and wherein the first cam follower includes first and second crosspieces that are diametrically opposite of each other, each of the first and second ramps having an upper end and the upper ends being diametrically opposite of each other, each of the first and second ramps having a lower end and the lower ends being diametrically opposite of each other such that the first and second ramps draw the first and second crosspieces away from the first plane at the same time.

9. The bath safety rail of claim 1, wherein the base includes an inside and an outside, the cam including a first tab that extends from the inside to the outside such that the first tab can be manipulated by a finger to rotate the first cam and draw the first suction cup tightly against the bath surface.

10. The bath safety rail of claim 9, wherein the base includes a circular slot having said first axis and further having first and second ends, the first tab extending through the circular slot and traveling from the first end to the second end of the circular slot when the first tab is manipulated to turn the first cam.

11. The bath safety rail of claim 1, wherein the base includes a first receptacle shaped recess for receiving a portion of the first suction cup, the first receptacle shaped recess having a first opening on said first axis, the first cam follower extending from the first suction cup, then through the first opening, and then to the cam.

12. The bath safety rail of claim 1, and further comprising a second fastener and second through slot, the first cam turning relative to each of the first and second fasteners.

13. The bath safety rail of claim 1, wherein said first through slot is arcuate in shape and arcuate relative to said first axis.

14. The bath safety rail of claim 1, wherein the first through slot turns relative to the first fastener.

15. The bath safety rail of claim 1, wherein the handle includes first and second legs, wherein the first cam includes first and second through slots, wherein said first and second legs extend, respectively, through said first and second through slots, and wherein said first cam and said first and second through slots turn relative to said first and second legs.

16. The bath safety rail of claim 1, wherein the handle includes a first leg, the first leg extending through the first through slot, the first through slot having first and second ends, the first cam and first through slot turning relative to said first leg such that said first leg is disposable at a first end of the first through slot at a first time and at a second end of the first through slot at a second time.

17. The bath safety rail of claim 1, wherein said first through slot is arcuate in shape and arcuate relative to said first axis, and further comprising a second through slot that is arcuate in shape and arcuate relative to said first axis, the first and second through slots diametrically opposing each other.

* * * * *